3,033,646
METHOD OF SEPARATING RARE EARTH METAL IONS
Robert D. Hansen, Midland, Mich., assignor to The Dow Chemical Company, Midland, Mich., a corporation of Delaware
No Drawing. Filed Oct. 9, 1957, Ser. No. 689,051
4 Claims. (Cl. 23—23)

This invention concerns a method and agents for separating rare earth metal ions from one another with cation exchange resins.

The separation of rare earth metal ions from one another and recovery of the metals in substantial quantities is becoming of increasing interest. F. H. Spedding et al., in J. Am. Chem. Soc., vol. 76, pages 2557–60 (1954), describes a method of separating rare earth metals from one another wherein rare earth metal ions are sorbed on a bed of a cation exchange resin, then eluted through a second bed of the copper salt form of a cation exchange resin with an aqueous solution of an ammonium salt of ethylenediamine tetra acetic acid having a pH of 8 and collecting successive fractions of the effluent liquid, whereby the rare earth elements are obtained as individually pure fractions or as binary mixtures of the adjacent elements.

The method is not entirely satisfactory for separating and recovering the rare earth metals from one another since it requires the use of the copper salt form of a cation exchange resin. The copper is eluted from the resin into the effluent liquid, which increases the operations necessary to recover the metal from the effluent liquid, requires that the cation exchange resin be regenerated to the copper salt form prior to its reuse in the process and adds to the cost of separating the rare earth metals.

It has now been discovered that the rare earth metals can readily be separated from one another by sorbing the metal ions on the hydrogen form of a sulfonic acid type cation exchange resin, then eluting the metals from the resin with an aqueous solution of an alkali salt of diethylenetriamine penta acetic acid and collecting successive fractions of the effluent liquid.

The rare earth metals to be absorbed on the cation exchange resin can be in the form of an ionizable water-soluble salt of the same such as the chlorides, nitrates or sulfates of the rare earth metals or in the form of complex salts, e.g. a salt of diethylenetriamine penta acetic acid or a salt of nitrilotriacetic acid.

The cation exchange resin to be employed in the process can be a cation exchange resin containing sulfonic acid groups as the active groups of the same such as a sulfonated phenolformaldehyde resin or a sulfonated vinyl aromatic resin, e.g. sulfonated insoluble copolymers of a predominant amount of a monovinyl aromatic hydrocarbon and a minor amount of a divinyl aromatic hydrocarbon. A number of such cation exchange resins are known and are available to the trade as "Amberlite 1R–120," "Dowex 50," "Nalcite HCR" or "Chempro C–20." To be best suited for the purpose the cation exchange resin in hydrogen form should swell appreciably in water, i.e. the resin granules when swelled in water should contain from 40 to 80, preferably from 50 to 70 percent by weight of water. The swelling of the cation exchange resin granules in water is dependent in part upon the degree of cross-linking in the polymer, and in the case of copolymer resins of one or more monovinyl aromatic hydrocarbons cross-linked with a divinyl aromatic hydrocarbon, e.g. divinylbenzene, the resins preferably contain from 2 to 8 percent by weight of the divinyl aromatic hydrocarbon. Best results are usually obtained with cation exchange resins which are sulfonated copolymers of from 96 to 94 percent by weight of one or more monovinyl aromatic hydrocarbons, e.g. styrene or ethylvinylbenzene and from 4 to 6 percent of divinylbenzene. The cation exchange resins are employed in the acidic or hydrogen form and in the form of granules or beads of sizes between 20 and 400, preferably from 50 to 200, mesh per inch as determined by U.S. Standard screens.

The alkali salt of diethylenetriamine penta acetic acid to be employed in the process can be an aqueous solution of an ammonium, sodium, potassium or lithium salt of diethylenetriamine penta acetic acid, which solution has a pH value between 5.0 and 8.5. The aqueous solution contains the alkali salt of the diethylenetriamine penta acetic acid in a partially neutralized form, preferably containing an average of from 2.5 to 3.5 of the acetic acid groups in the form of said alkali salt, and in a concentration between 0.01 and 0.1, preferably from 0.01 to 0.04, molar solution of the same. The solutions can be prepared by mixing the diethylenetriamine penta acetic acid with water to form an aqueous 5 to 10 weight percent slurry of the same, then adding an alkali, e.g. ammonia, ammonium hydroxide, sodium hydroxide, potassium hydroxide or lithium hydroxide, thereto in amount sufficient to dissolve the acid and bring the solution to a pH value between 5 and 8.5 and diluting the solution to a volume corresponding to a concentration of from 0.01 to 0.1 of molar solution.

The process can be carried out employing one or a plurality of beds of the cation exchange resin, preferably a plurality of from two to eight or more beds of the resin, connected in series so that the rare earth metal ions are sorbed in a first section of a bed, or in the first one-third to two-thirds of a series of beds, of the resin, then is eluted through the remaining section of the bed, or series of beds, by the aqueous solution of the alkali salt of the diethylenetriamine penta acetic acid, which eluant has an action of effecting a displacement between the bands of the individual absorbed rare earth metal ions in the bed of the cation exchange resin with the resultant elution of the rare earth metals from the resin in successive portions or fractions of the effluent liquid. By collecting successive fractions of the effluent liquid there is obtained a fraction which contains an individual rare earth metal or fractions containing one or a plurality of the rare earth metals in admixture with one another and in a lesser number than the mixture of rare earth metals in the initial feed solution. Fractions of the effluent liquid which contain a plurality, e.g. two or more, of the rare earth metals can be further treated in the aforesaid manner to effect a separation of the metals from one another.

In practice of the invention, a bed of a granular cation exchange resin containing sulfonic acid groups as the active groups of the same, preferably an insoluble sulfonated vinyl aromatic polymer, and in the hydrogen form, is flooded with water. Then an aqueous solution of salts, suitably the chlorides, of the rare earth metals to be separated from one another is fed slowly to the bed so as to displace an equal volume of water from the bed and load the rare earth metal ions on the resin, i.e. effect sorption of the rare earth metal ions on the cation exchange resin. The resin is loaded with the rare earth metal ions in amount corresponding to from one-third to two-thirds of the total capacity of the resin bed, or beds, when a plurality of beds are used. The flow of liquid through the bed(s) can be in any direction, but is preferably either upward or downward. After loading the rare earth metal ions onto the resin, the bed is flushed with water to displace acid, formed by absorption of the rare earth metal ions on the resin, from the bed. Thereafter, an aqueous solution of an alkali salt of diethylenetriamine penta acetic acid, preferably the ammonium salt, having a pH value between 5 and 8.5 is fed to the bed to displace or elute the sorbed rare earth metal ions from the resin. The flow of the eluting solution is continued to effect displacement between bands of the absorbed rare earth metal ions in the resin bed and eventually displacement from the bed of individual rare earth metals in successive fractions of the effluent liquid. The total amount of wash water employed to displace the acid, formed in the first step of loading the rare earth metal ions on the cation exchange resin, from the bed need not be greater than the amount of water surrounding the resin granules, but should be sufficient to displace the acid from the bed ahead of the aqueous solution of the alkali salt of the diethylenetriamine penta acetic acid.

In a given cycle of the above-mentioned operations, i.e. passage of the aqueous solutions through a bed of the cation exchange resin, there are collected as successive fractions of the effluent liquid: (a) water flushed from the bed of the cation exchange resin during loading of the rare earth metals on the resin; (b) a fraction containing the acid formed by sorption of the rare earth metals and displacement of hydrogen ions from the resin; (c) a fraction consisting essentially of water; (d) a fraction rich in diethylenetriamine penta acetic acid; (e) a fraction containing diethylenetriamine penta acetic acid rare earth metal complex salt; and (f) subsequent fractions containing rare earth metal complex salts until all of the rare earth metal ions are displaced from the bed of the resin.

By collecting successive fractions of the effluent liquid, the fraction rich in diethylenetriamine penta acetic acid is obtained in a concentration, which upon converting to the desired alkali salt and dilution with water to form an aqueous solution having a pH value between 5 and 8.5 and a concentration of the salt between 0.01 and 0.1 molar solution, can be recycled to the process for eluting a further quantity of the rare earth metals from the bed of the resin in a subsequent cycle of operations.

It may be mentioned that the fraction (d) of the effluent liquid containing the diethylenetriamine penta acetic acid is usually obtained in the process as a solution containing said acid in a molar concentration of about 2.5 times the molar concentration of the salt in the eluting solution fed to the bed.

The fractions of the effluent liquid subsequent to the fraction containing the diethylenetriamine penta acetic acid are collected successively and contain a major portion of one or a mixture of the diethylenetriamine penta acetic acid rare earth metal complex salts. By collecting successive fractions of the effluent liquid containing the rare earth metal complex salts the rare earth metals are obtained in individually pure fractions or mixtures of only a few of the rare earth metals. The effluent liquid containing mixtures of the rare earth metals can be treated as herein described to effect a separation of the individual elements.

The rare earth metals can be recovered from the aqueous solution of the complex salts of the same in usual ways, e.g. by adding oxalic acid or an aqueous solution of oxalic acid thereto to precipitate the rare earth metal oxalate and separating the latter by filtering. The oxalate is ignited by heating to form the oxide of the rare earth metal.

The following examples illustrate ways in which the principle of the invention has been applied, but are not to be construed as limiting its scope.

EXAMPLE 1

A glass tube of 0.5 inch internal diameter was filled with 100 ml. of a granular cation exchange resin to form a bed of the resin 79 cm. deep. The cation exchange resin employed in the experiment was an insoluble resinous phenol sulfonic acid-formaldehyde condensation product in the form of granules of sizes between 20 and 50 mesh per inch as determined by U.S. Standard screens. The cation exchange resin was converted to its acidic or hydrogen form and was rinsed with distilled water. The tube was held in a vertical position and was filled with water. The tube was surrounded by a jacket through which water at a temperature of 70° C. was circulated to maintain the bed of the resin at said temperature throughout the experiment. A charge of 250 ml. of a 0.12 normal aqueous solution of a mixture of rare earth metal chlorides containing principally yttrium, together with lesser amounts of erbium, holmium and dysprosium, in total amount corresponding to 30 milliequivalents of trivalent rare earth metal ions, was fed to the column at a rate of 5 ml. per minute and passed downflow through the bed of the resin. This was followed by the feed of water to the column and rinsing of the resin until the effluent liquid was free of acid or hydrogen ions. Thereafter, a 0.015 normal aqueous solution of the tri-ammonium salt of diethylenetriamine penta acetic acid having a pH value of 8, was fed to the column at a rate of 4.8 ml. per minute and was passed downflow through the bed of the resin. The effluent liquid was collected in 21 ml. portions. These portions were analyzed to determine the relative amounts of the rare earth metals in the effluent liquid. Table I identifies the fractions, gives the total volume of the effluent liquid and the amounts of rare earth metals in the portions of effluent liquid which were analyzed expressed as percent by weight. In the experiment only a part of the 21 ml. portions of the effluent liquid were analyzed.

*Table I*

| Fraction No. | Effluent Liquid Total, ml. | Y, Percent | Er, Percent | Ho, Percent | Dy, Percent |
|---|---|---|---|---|---|
| 1 | 2,100 | 0.0 | 0.0 | 0.0 | 0.0 |
| 2 | 2,121 | 0.025 | 0.007 | 0.004 | 0.010 |
| 3 | 2,226 | 0.046 | 0.008 | 0.005 | 0.013 |
| 4 | 2,331 | 0.058 | 0.008 | 0.006 | 0.008 |
| 5 | 2,436 | 0.074 | 0.007 | 0.003 | 0.009 |
| 6 | 2,541 | 0.083 | 0.005 | 0.004 | 0.008 |
| 7 | 2,646 | 0.086 | 0.006 | 0.004 | 0.006 |
| 8 | 2,752 | 0.089 | 0.004 | 0.005 | 0.006 |
| 9 | 2,856 | 0.091 | 0.005 | 0.004 | 0.005 |
| 10 | 2,961 | 0.084 | 0.0 | 0.0 | 0.003 |
| 11 | 3,066 | 0.081 | | | 0.0 |
| 12 | 3,166 | 0.086 | | | |
| 13 | 3,276 | 0.081 | | | |
| 14 | 3,381 | 0.071 | | | |
| 15 | 3,486 | 0.049 | | | |
| 16 | 3,596 | 0.028 | | | |

EXAMPLE 2

A glass tube of 0.5 inch internal diameter was filled with 100 ml. of granules of the hydrogen form of a cation exchange resin to form a bed of the resin 79 cm. deep. The cation exchange resin employed in the experiment was a nuclear sulfonated copolymer of approximately 92 percent by weight styrene, 4 percent ethylvinylbenzene and 4 percent divinylbenzene. The granules were of sizes of from 50 to 70 mesh per inch according to U.S. Standard screens. The tube was held in a vertical position and was filled with water to the top level of the resin bed. A charge of 500 ml. of a 0.1 normal aqueous solution of a mixture of rare earth metal chlorides containing about 80 percent by weight of yttrium chloride, together with lesser amounts of erbium, holmium, dysprosium, terbium and gadolinium, chlorides was fed to the column at a rate of 4.8 ml. per minute and was passed downflow through the bed of the cation exchange resin, while maintaining the resin bed and the liquid at a temperature of 70° C. This was followed by the feed of water to the column at a rate of 5 ml. per minute and rinsing of the bed of the resin until the effluent liquid was free from acid or hydrogen ions. Thereafter, a 0.015 normal aqueous solution of the tri-ammonium salt of diethylenetriamine penta acetic acid was fed to the column at a rate of 4.8 ml. per minute and passed downflow through the resin bed. The effluent liquid was collected in 21 ml. portions. Selected portions or fractions were analyzed to determine the proportion of the rare earth metals in the effluent liquid. Table II identifies the fractions and gives the amounts of the rare earth metals in the fractions which were analyzed. In the experiment eluting of the rare earth metals from the bed of the resin was discontinued after the effluent liquid was found to contain only yttrium.

*Table II*

| Fraction No. | Effluent Liquid Total, ml. | Y, Percent | Er, Percent | Ho, Percent | Dy, Percent | Tb, Percent | Gd, Percent |
|---|---|---|---|---|---|---|---|
| 1 | 2,100 | 0.0 | 0.0 | 0.0 | 0.0 | 0.0 | 0.0 |
| 2 | 2,121 | 0.0 | 0.030 | 0.014 | 0.082 | | |
| 3 | 2,184 | 0.0 | 0.039 | 0.024 | 0.092 | 0.008 | |
| 4 | 2,237 | 0.0 | 0.034 | 0.018 | 0.083 | 0.011 | 0.012 |
| 5 | 2,310 | 0.009 | 0.028 | 0.009 | 0.060 | 0.014 | 0.036 |
| 6 | 2,373 | 0.03 | 0.017 | 0.006 | 0.030 | 0.012 | 0.056 |
| 7 | 2,436 | 0.07 | 0.003 | 0.0 | 0.006 | 0.002 | 0.063 |
| 8 | 2,499 | 0.12 | 0.0 | | 0.0 | 0.0 | 0.031 |
| 9 | 2,583 | 0.13 | | | | | 0.0 |
| 10 | 2,730 | 0.13 | | | | | |

EXAMPLE 3

The procedure of Example 2 was repeated employing a nuclear sulfonated copolymer of approximately 80 percent by weight styrene, 8 percent ethylvinylbenzene and 12 percent divinylbenzene in the hydrogen form and in granules of sizes between 50 and 70 mesh per inch as determined by U.S. Standard screens. A charge of 50 milliequivalents of rare earth metal chlorides similar to those employed in Example 2 was loaded onto 100 ml. of the granular resin, and after rinsing the bed with water until free of acid, was eluted from the bed by working the same with a 0.015 normal aqueous solution of the tri-ammonium salt of diethylenetriamine penta acetic acid. The effluent liquid was collected in 21 ml. portions. A part of these portions or fractions were analyzed to determine the amount of rare earth metals in the effluent liquid. Table III identifies the fractions and gives the amounts of the rare earth metals, expressed as percent by weight of the fraction in the portions of the effluent liquid which were analyzed.

*Table III*

| Fraction No. | Effluent Liquid Total, ml. | Y, Percent | Er, Percent | Ho, Percent | Dy, Percent | Tb, Percent | Gd, Percent |
|---|---|---|---|---|---|---|---|
| 1 | 2,100 | 0.0 | 0.0 | 0.0 | 0.0 | 0.0 | 0.0 |
| 2 | 2,121 | 0.0 | 0.014 | 0.007 | 0.031 | 0.005 | 0.0 |
| 3 | 2,184 | 0.002 | 0.022 | 0.011 | 0.055 | 0.008 | 0.007 |
| 4 | 2,227 | 0.010 | 0.018 | 0.009 | 0.051 | 0.011 | 0.017 |
| 5 | 2,310 | 0.020 | 0.012 | 0.006 | 0.046 | 0.008 | 0.022 |
| 6 | 2,373 | 0.030 | 0.007 | 0.005 | 0.029 | 0.010 | 0.025 |
| 7 | 2,436 | 0.050 | 0.002 | 0.002 | 0.020 | 0.007 | 0.021 |
| 8 | 2,499 | 0.060 | 0.003 | 0.004 | 0.012 | 0.005 | 0.018 |
| 9 | 2,552 | 0.060 | 0.002 | 0.001 | 0.008 | 0.002 | 0.017 |
| 10 | 2,667 | 0.080 | 0.002 | 0.0 | 0.007 | 0.0 | 0.014 |
| 11 | 3,087 | 0.080 | 0.0 | | 0.0 | | 0.004 |
| 12 | 3,633 | 0.100 | | | | | 0.0 |

EXAMPLE 4

A jacketed glass tube of 0.5 inch internal diameter was filled with 100 ml. of particles of sizes between 100 and 200 mesh per inch as determined by U.S. Standard screens of the hydrogen form of a cation exchange resin consisting of a nuclear sulfonated copolymer of about 93 percent by weight of styrene, 3 percent of ethylvinylbenzene and 4 percent of divinylbenzene. The resin had a capacity of 1.34 milliequivalents of hydrogen per milliliter of the resin. A feed solution was prepared by dissolving 2.1724 grams of a mixture of rare earth metal oxides containing about 80 percent by weight of yttrium oxide in an aqueous 12-normal hydrochloric acid solution and diluting the same with water to a total volume of 200 ml. A charge of 195 ml. of the solution was fed at a rate of 3 ml. per minute to the top of the column and passed downflow through the bed of the cation exchange resin. The column was rinsed with water until free of acid. An eluting solution was prepared by dissolving 35.4 grams of diethylenetriamine penta acetic acid in concentrated aqueous ammonium hydroxide solution and diluting the same with water to form a final solution having a volume of 3 liters and a pH of 8. Deionized and deaerated water was fed to the column of the cation exchange resin containing the sorbed rare earth metals while heating the bed of the resin to a temperature of 70° C. by passing hot water through the jacket surrounding the column. Thereafter, the aqueous eluting solution of the diethylenetriamine penta acetic acid triammonium salt having a pH value of 8 was fed to the column at a rate of 4.8 ml. per minute and passed downflow through the bed of the resin. The effluent liquid was collected in 21 ml. portions. Selected portions of the effluent liquid were analyzed to determine the relative amounts of the rare earth metals in the effluent liquid. Table IV identifies the fractions, gives the total volume of the effluent liquid and the percent of rare earth metals in the fraction expressed as percent by weight. In the experiments only a part of the fractions were analyzed.

*Table IV*

| Fraction No. | Effluent Liquid Total, Ml. | Y, Percent | Er, Percent | Ho, Percent | Dy, Percent | Gd, Percent | Tb, Percent | Yb, Percent | Tm, Percent | Sm, Percent |
|---|---|---|---|---|---|---|---|---|---|---|
| 1 | 924 | 0.0 | 0.0 | 0.0 | 0.0 | 0.0 | 0.0 | 0.0 | 0.0 | 0.0 |
| 2 | 945 | | 0.014 | 0.004 | 0.029 | | | | | |
| 3 | 987 | | 0.088 | 0.045 | 0.25 | | 0.009 | 0.022 | | |
| 4 | 1,029 | | 0.090 | 0.045 | 0.21 | 0.015 | 0.026 | 0.036 | | |
| 5 | 1,071 | 0.004 | 0.042 | 0.056 | 0.084 | 0.14 | 0.043 | 0.034 | 0.004 | |
| 6 | 1,113 | 0.13 | 0.0 | 0.010 | 0.005 | 0.13 | 0.0 | 0.0 | 0.0 | 0.022 |
| 7 | 1,155 | 0.21 | | 0.0 | 0.0 | 0.0 | | | | 0.0 |
| 8 | 1,197 | 0.20 | | | | | | | | |
| 9 | 1,240 | 0.19 | | | | | | | | |
| 10 | 1,303 | 0.19 | | | | | | | | |
| 11 | 1,449 | 0.18 | | | | | | | | |
| 12 | 1,512 | 0.19 | | | | | | | | |
| 13 | 1,596 | 0.16 | | | | | | | | |
| 14 | 1,680 | 0.12 | | | | | | | | |
| 15 | 1,764 | 0.062 | | | | | | | | |
| 16 | 1,848 | 0.032 | | | | | | | | |
| 17 | 1,890 | 0.0 | | | | | | | | |

EXAMPLE 5

A 1-inch internal diameter glass tube 66 inches long was filled with 847 ml. of a granular cation exchange resin. The cation exchange resin employed in the experiment was similar to that employed in Example 2. The bed of the cation exchange resin was loaded with 1.1 equivalents of rare earth metals by passing an aqueous solution of rare earth metal chlorides rich in gadolinium chloride downflow through the bed. The bed of resin was then rinsed with deionized water. Thereafter an aqueous solution of a 0.0128-molar diethylenetriamine penta acetic acid triammonium salt having a pH of 7 was fed to the column at a rate of 20 ml. per minute and passed downflow through the bed of the resin. The effluent liquid was fed to the top of a second column consisting of a 1-inch internal glass tube 11 feet long filled with 1700 ml. of a cation exchange resin consisting of a nuclear sulfonated copolymer of 92 percent by weight of styrene, 4 percent of ethylvinylbenzene and 4 percent of divinylbenzene. The cation exchange resin was in its hydrogen form and consisted of particles of sizes between 50 and 75 mesh per inch as determined by U.S. Standard screens.

The effluent liquid from the bottom of the first column was fed to the top of the second 11 foot column and was passed downflow through the bed of the resin in said column. The effluent liquid from the 11 foot column was collected in separate one liter portions. Selected portions of the effluent liquid were analyzed to determine the proportion of rare earth metals in the respective fractions of the effluent liquid. Table V identifies the fractions which were analyzed, gives the total volume of the effluent liquid and the percent by weight of rare earth metals in the portions of the effluent liquid which were analyzed.

Table V

| Fraction No. | Total Effluent Liquid, Ml. | Ho, Percent | Tb, Percent | Yb, Percent | Gd, Percent | Y, Percent | Sm, Percent | Fe, Percent |
|---|---|---|---|---|---|---|---|---|
| 1 | 3,690 | 0.0 | 0.0 | 0.0 | 0.0 | 0.0 | 0.0 | 0.0 |
| 2 | 4,690 | 0.003 | 0.005 | 0.014 | 0.073 | | | |
| 3 | 7,690 | 0.0 | 0.002 | 0.008 | 0.14 | | | |
| 4 | 10,690 | | 0.0 | 0.006 | 0.15 | | | |
| 5 | 13,690 | | | 0.007 | 0.16 | | | |
| 6 | 17,690 | | | 0.0 | 0.16 | | | |
| 7 | 21,690 | | | | 0.16 | | | |
| 8 | 25,690 | | | | 0.16 | | | |
| 9 | 29,690 | | | | 0.13 | 0.003 | 0.012 | |
| 10 | 33,690 | | | | 0.073 | 0.004 | 0.016 | |
| 11 | 37,690 | | | | 0.024 | 0.010 | 0.009 | 0.009 |
| 12 | 41,690 | | | | 0.008 | 0.005 | 0.0 | 0.021 |
| 13 | 45,690 | | | | 0.0 | 0.0 | | 0.027 |
| 14 | 49,690 | | | | | | | 0.017 |

I claim:

1. A process for separating the rare earth metal values of salts of yttrium gadolinium from a plurality of ionizable salts of rare earth metals and from salts of one another contained in an aqueous solution, which process comprises feeding an aqueous solution containing ionizable salts of a plurality of rare earth metal values consisting of a predominant amount of at least one of the rare earth metals yttrium and gadolinium into contact with a bed of the hydrogen form of a cation exchange resin containing sulfonic acid groups as the active group of the resin, whereby the rare earth metal values are sorbed on the cation exchange resin, then feeding to the bed an aqueous eluant solution consisting of a from 0.01 to 0.1 molar solution of an alkali salt of diethylenetriamine penta acetic acid selected from the group consisting of the ammonium, sodium, potassium and lithium salts of diethylenetriamine penta acetic acid having an average of from 2.5 to 3.5 of the acetic acid groups in the form of said alkali salt and having a pH value between 5.0 and 8.5, thereby selectively eluting the absorbed rare earth metal values from the resin, and collecting successive fractions of the effluent liquid which contain the yttrium and gadolinium metal values separated from the other rare earth metal values and from one another and recovering the yttrium and gadolinium metal values from the separate fractions of the effluent liquid.

2. A process as claimed in claim 1, wherein the cation exchange resin is a nuclear sulfonated insoluble copolymer of vinyl aromatic hydrocarbons.

3. A process for separating the rare earth metal values of salts of yttrium from a mixture of ionizable salts of rare earth metals which process comprises feeding an aqueous solution containing ionizable salts of at least two rare earth metals and consisting of a predominant amount of the salts of yttrium into contact with a bed of the hydrogen form of a cation exchange resin containing sulfonic acid groups as the active groups of the resin whereby the rare earth metal values are sorbed on the resin, then feeding to the bed of the resin an eluant solution consisting of a from 0.01 to 0.1 molar aqueous solution of a diethylenetriamine penta acetic acid ammonium salt having an average of from 2.5 to 3.5 of the acetic acid groups in the form of the ammonium salt and having a pH value between 5 and 8.5, thereby selectively eluting the sorbed rare earth metal values from the resin and collecting successive fractions of the effluent liquid whereby there is obtained a fraction of the effluent liquid containing yttrium as the sole rare earth metal constituent separated from the other rare earth metal values and recovering the yttrium from said fraction of the effluent liquid.

4. A process for separating the rare earth metal values of salts of gadolinium from a mixture of ionizable salts of rare earth metals which process comprises feeding an aqueous solution containing ionizable salts of at least two rare earth metals and consisting of a predominant amount of the salts of gadolinium into contact with a bed of the hydrogen form of a cation exchange resin containing sulfonic acid groups as the active groups of the resin, whereby the rare earth metal values are sorbed on the resins, then feeding to the bed of the resin an eluant solution consisting of a from 0.01 to 0.1 molar solution of a diethylenetriamine penta acetic acid ammonium salt solution having an average of from 2.5 to 3.5 of the acetic acid groups in the form of the ammonium salt and having a pH value of from 5 to 8.5, thereby selectively eluting the sorbed rare earth metal values from the resin, and collecting successive fractions of the effluent liquid, whereby there is obtained a fraction of the effluent liquid containing gadolinium as the sole rare earth metal constituent separated from the other rare earth metal values and recovering the gadolinium from said fraction of the effluent liquid.

(References on following page)

References Cited in the file of this patent

UNITED STATES PATENTS

| | | |
|---|---|---|
| 2,539,282 | Spedding et al. | Jan. 23, 1951 |
| 2,756,123 | Bailes et al. | July 24, 1956 |
| 2,798,789 | Spedding et al. | July 9, 1957 |
| 2,816,060 | Carter | Dec. 10, 1957 |
| 2,897,050 | Jaffe | July 28, 1959 |

OTHER REFERENCES

Martell et al.: "Chemistry of the Metal Chelate Compounds," August 1956, pages 195–197.

Wheelwright et al.: Atomic Energy Comm. Document, ISC 637, June 1955.

Vickery: "Chemical Society Journal" (British publication), 1952, Part IV, pages 4357 to 4363 inclusive.

Frost, A. E.: "Polyaminopolycarboxylic . . . Amines," Nature, vol. 178, No. 4528, August 11, 1956, page 322.

Topp, N. E.: Chemical Abstracts, vol. 51, page 5609c, 1957.

Smith, L. H., et al.: Journal of Inorganic and Nuclear Chemistry, vol. 3, pages 243–247 (1956).

Kunin et al.: "Ion Exchange Resins," publ. by J. Wiley and Sons, N.Y., 1950, pages 68, 118 and 119.